United States Patent [19]
Bateman et al.

[11] Patent Number: 5,884,032
[45] Date of Patent: Mar. 16, 1999

[54] SYSTEM FOR COORDINATING COMMUNICATIONS VIA CUSTOMER CONTACT CHANNEL CHANGING SYSTEM USING CALL CENTRE FOR SETTING UP THE CALL BETWEEN CUSTOMER AND AN AVAILABLE HELP AGENT

[75] Inventors: Thomas Howard Bateman; Bruce Edward Kierstead; William Alexander Noble, all of Saint John; Timothy Lee Curry, Gondola Pt.; John Alan Lockett, Saint John; Laurie Edward Mersereau, Westfield; Robert James Ouellette, Saint John, all of Canada

[73] Assignee: The New Brunswick Telephone Company, Limited, Canada

[21] Appl. No.: 532,537

[22] Filed: Sep. 25, 1995

[51] Int. Cl.$^6$ .............................. G06F 17/27; G06F 3/14; G06F 13/14

[52] U.S. Cl. .............................. 395/200.34; 395/200.36; 395/200.57; 370/356; 379/201; 379/265; 379/209; 379/216

[58] Field of Search ...................... 395/155, 156, 395/157, 158, 159, 160, 161, 700, 200.36, 200.57, 200.34; 379/88.19, 900, 40, 9, 203, 201, 202, 265, 266, 216, 209; 370/356

[56] References Cited

U.S. PATENT DOCUMENTS

| | | |
|---|---|---|
| 4,789,962 | 12/1988 | Berry et al. .............................. 364/900 |
| 4,969,185 | 11/1990 | Dorst et al. .............................. 379/209 |
| 5,001,710 | 3/1991 | Gawrys et al. ....................... 370/110.1 |
| 5,155,806 | 10/1992 | Hoeber et al. .......................... 395/157 |
| 5,157,768 | 10/1992 | Hoeber et al. .......................... 395/157 |
| 5,175,812 | 12/1992 | Krieger .................................. 395/156 |
| 5,361,361 | 11/1994 | Hickman et al. ....................... 395/700 |
| 5,384,771 | 1/1995 | Isidoro et al. ......................... 370/58.2 |
| 5,428,608 | 6/1995 | Freeman et al. ....................... 370/60.1 |
| 5,444,774 | 8/1995 | Friedes .................................. 379/266 |
| 5,500,891 | 3/1996 | Harrington et al. .................... 379/265 |
| 5,535,323 | 7/1996 | Miller et al. ........................... 395/155 |
| 5,557,668 | 9/1996 | Brady .................................... 379/212 |
| 5,563,805 | 10/1996 | Arbuckle et al. .................. 364/514 C |
| 5,619,508 | 4/1997 | Davis et al. ............................ 370/495 |

*Primary Examiner*—Thomas C. Lee
*Assistant Examiner*—Rehana Perveen
*Attorney, Agent, or Firm*—Burns, Doane, Swecker & Mathis

[57] ABSTRACT

This invention (The Customer Contact Channel Changer) enables the integration of different Customer Contact Channels such as live call center ACD (Automatic Call Distribution) agents, ADSI (Analog Display Services Interface) enhanced IVR (Interactive Voice Response) systems and WWW (World Wide Web) servers. The world wide web servers are used to allow customers with computer equipment to access information from an organizations databases in a self service mode. Frequently these customers have questions best answered by human ACD agents. With this invention the connection between the customer with the question and the agent with the answer is done quickly and efficiently with both parties sharing screens of common information. Also control is retained by the customer to make the call happen when they want it.

19 Claims, 11 Drawing Sheets

SYSTEM FOR COORDINATING COMMUNICATIONS VIA CUSTOMER CONTACT CHANNEL CHANGING SYSTEM USING CALL CENTRE FOR SETTING UP THE CALL BETWEEN CUSTOMER AND AN AVAILABLE HELP AGENT

FIELD OF THE INVENTION

This invention relates to accessing remote information network services such as those of the WWW (World Wide Web) and particularly, but not exclusively to the manner in which help is enlisted when needed.

BACKGROUND OF INVENTION

Some telephone companies (e.g., NBTel, New Brunswick, Canada) have been heavily involved with the development and use of both call centre services and Internet services. More specifically, efforts have been underway to utilize CTI (Computer Telephony Integration) within call centres to improve the productivity and service levels within call centres. CTI uses integration capabilities in various manners to assist telephone users who have access to computer equipment to improve the process of making or receiving phone calls. Call centre technology generally uses both computer equipment and telecommunications equipment with CTI being a key element of productive call centres.

The use of new Internet services such as WWW servers to allow organizations to interact with their customers in a self service mode is also being promoted. These WWW servers utilize hypertext and multimedia content to allow customers to see text, images, etc. associated with products and services.

Due to human nature and other factors these customers frequently need human assistance to completely satisfy their needs and would likely jot down an 800 telephone number with a pencil and paper. They would then call the 800 number to gain access (if the 800 zone coverage was appropriate) to an ACD (Automatic Call Distribution) centre belonging to that organization. Under many circumstances today they would then sit frustrated in an ACD queue awaiting the availability of a live agent. Thus, there are at least two disadvantages of current systems. First, the need for the customer to physically record and dial the 800 number is a disincentive to making the call. Secondly, the likelihood of waiting in long ACD queues is also a disincentive to making the call. Once the call is made, the queue may also result in the call being terminated before successful completion because of the delay experienced.

A recent improvement in the integration of computers and telephones is disclosed in U.S. Pat. No. 5,001,710. A system is disclosed which lets telemarketing agents who are answering calls for multiple campaigns simultaneously, to be set up automatically in their computing environment at the correct campaign based upon the phone number dialed by the customer, and to receive caller related information automatically. However, the user is required to physically dial an 800 number, and likely must wait in an ACD queue.

Furthermore, although the agent is set up at the correct campaign, a more accurate initial setup, which for example incorporates the specifics of the customer's queries, is not possible. Finally, this system is not designed for helping users of the Internet.

SUMMARY OF THE INVENTION

It is an object of the invention to provide a means for integrating WWW services with live ACD agents in a manner that mitigates the above mentioned disadvantages.

It is another object of the invention to make this process faster and simpler so as to improve the likelihood of a successful connection to a live agent.

The invention provides a method of quickly enabling the changing of customer contact channels under control of the calling customer. A customer contact channel is a specific means of communication between the customer and a sales/service provider. Examples of customer contact channels include verbal phone conversations between customers and human ACD agents of the service/sales organization, IVR (interactive voice response) interactions between customers and IVR servers associated with the service/organization, ADSI (analog display services interface) enhanced IVR interactions between customers and associated servers, and WWW interactions between customers and associated WWW servers. These channels use various communications appliances or terminals such as a regular touch tone telephone, ADSI enhanced telephone (such as Nortel Vista 350), multimedia PC's or multimedia set-top boxes (such as Phllps/Zenith/CLI Media Access Terminals) and television sets.

The invention provides a series of methods for integrating WWW services with live ACD agents. These methods include establishment of two-way voice connectivity between a customer and a human ACD agent while sharing common screens of information on a WWW page. This connectivity provides requested "LIVE HELP" when a problem is encountered or when an alternate channel is preferred for various reasons. These methods deploy CTI, IVR and related techniques involving the use of computer software and hardware working in conjunction with telephone systems. The specific methods best suited for an individual customer will depend on a number of factors such as the call centre's telephony architecture, the call centre's computing architecture and organizational philosophy and approaches regarding inbound and outbound calling and customer contact concepts.

IVR allows for automated handling of scripted or routine telephone conversations. The customer, once connected to an IVR system, is verbally provided with information and options by a computer generated or recorded voice. The customer is able to make selections with the telephone keypad. An ADSI (analog display services interface) enhanced IVR system (e.g., NBTel Express or NBTel CallMall) also provides a text screen that allows easier navigation to the user. These are accessed by ADSI capable telephone sets equipped with a screen.

The invention provides methods for integrating and connecting a human ACD agent and a customer who is using the WWW and wishes human assistance. Furthermore, the invention provides a customer in voice conversation with an ACD agent an option to enhance that conversation with shared screens of information (images, text, etc.). The invention is intended to be used by organizations or individuals with WWW servers and ACD agents. The invention was initially developed to illustrate the Joint use of two powerful marketing channels (WWW and ACD agents) and that their combination produces an even more powerful channel than either alone. The main features of this invention are the ability to link and integrate customers (who may have obtained product awareness information or directory information via a WWW server) and appropriate ACD agents or individuals to provide supplementary information or assistance.

According to a first broad aspect, the invention provides in a communications system comprising a server on a network, means for connecting the server to at least one computer in a remote customer premises, a help channel and a call centre connected to the help channel connectable through the public switched telephone network to a telephone in the customer premises, an apparatus and method for the customer to obtain help in relation to a page from the server displayed by the computer comprising the steps of the customer selecting a remote help option from the page; the customer preparing a help request form comprising the number of the customer's telephone; the system transferring the help request to the call centre; and the call centre setting up a call over the public switched telephone network between the customer telephone and the help channel.

According to a second broad aspect, the invention provides in a communications system comprising a server on a network, means for connecting the server to at least one computer in a remote customer premises, a help channel and a call centre connected to the help channel connectable through the information network to the computer, an apparatus and method for the customer to obtain help in relation to a page from the server displayed by the computer comprising the steps of the customer selecting a remote help option from the page; the customer computer automatically preparing a help request form comprising a network address; the system automatically transferring the help request to the call centre; and the call centre setting up a virtual audio channel on the data network between the channel and the customer computer.

According to a third broad aspect, the invention provides in a communications system comprising a server on a network, means for connecting the server to at least one of either a computer or a set-top box and television in a remote customer premises, a help channel and a call centre connected to the help channel connectable through the public switched telephone network to a telephone in the customer premises, an apparatus method for the customer to obtain help in relation to a page from the server displayed by the computer comprising the steps the customer selecting a remote help option from the page; the customer set-top box or computer signalling a telephone switch to ring the customers telephone line (with a normal ring or a distinctive ring) in response to the customer selecting the help option; the telephone switch dialing the call centre automatically when the customer the picks up the handset; and the call centre transferring the call to the help channel.

According to a fourth broad aspect, the invention provides in a communications system comprising a server on a network, means for connecting the server to at least one computer in a remote customer premises, a help channel and a call centre connected to the help channel connectable through the public switched telephone network to a telephone in the customer premises, an apparatus and method for the customer to obtain help in relation to a page from the server displayed by the computer comprising the steps of the customer selecting a remote help option from the page; the customer computer automatically passing a help phone number listed within the page to communications software running on the customer's computer; and the communications software dialing the help phone number with a modem and line connected to the customer's computer and telephone; whereby a voice connection is established between the customer telephone and the help channel.

According to a fifth broad aspect, the invention provides in a communications system comprising a server on a network, means for connecting the server to at least one computer equipped with an SVD (simultaneous voice data) modem in a remote customer premises, a help channel comprising a live agent workstation equipped with at least one computer equipped with an SVD modem, and a call centre connected to the help channel, an apparatus and method for the customer to obtain help in relation to a page from the server displayed by the computer comprising the steps: establishing a voice connection between a customer telephone and an agent telephone over the PSTN; the agent connecting the agent computer to the server if not already connected; the customer disconnecting the customer computer from the server if connected unless equipped to handle more than one connection; both the customer and ACD agent activating their SVD (Simultaneous Voice Data) Modems (or ISDN units) such that data and voice connections are established where previously only a voice connection existed in such a way that the agent who is already connected to the desired server acts as a host and the caller acts as a remote connected to the agent's host and in communication with the host over the data portion of the connection and the caller is able to view the same pages as the agent, and the agent can provide the caller with assistance by walking the customer through the information from the server, and discuss it over the voice connection.

DESCRIPTION OF THE PREFERRED EMBODIMENTS OF THE INVENTION

Figure 1:
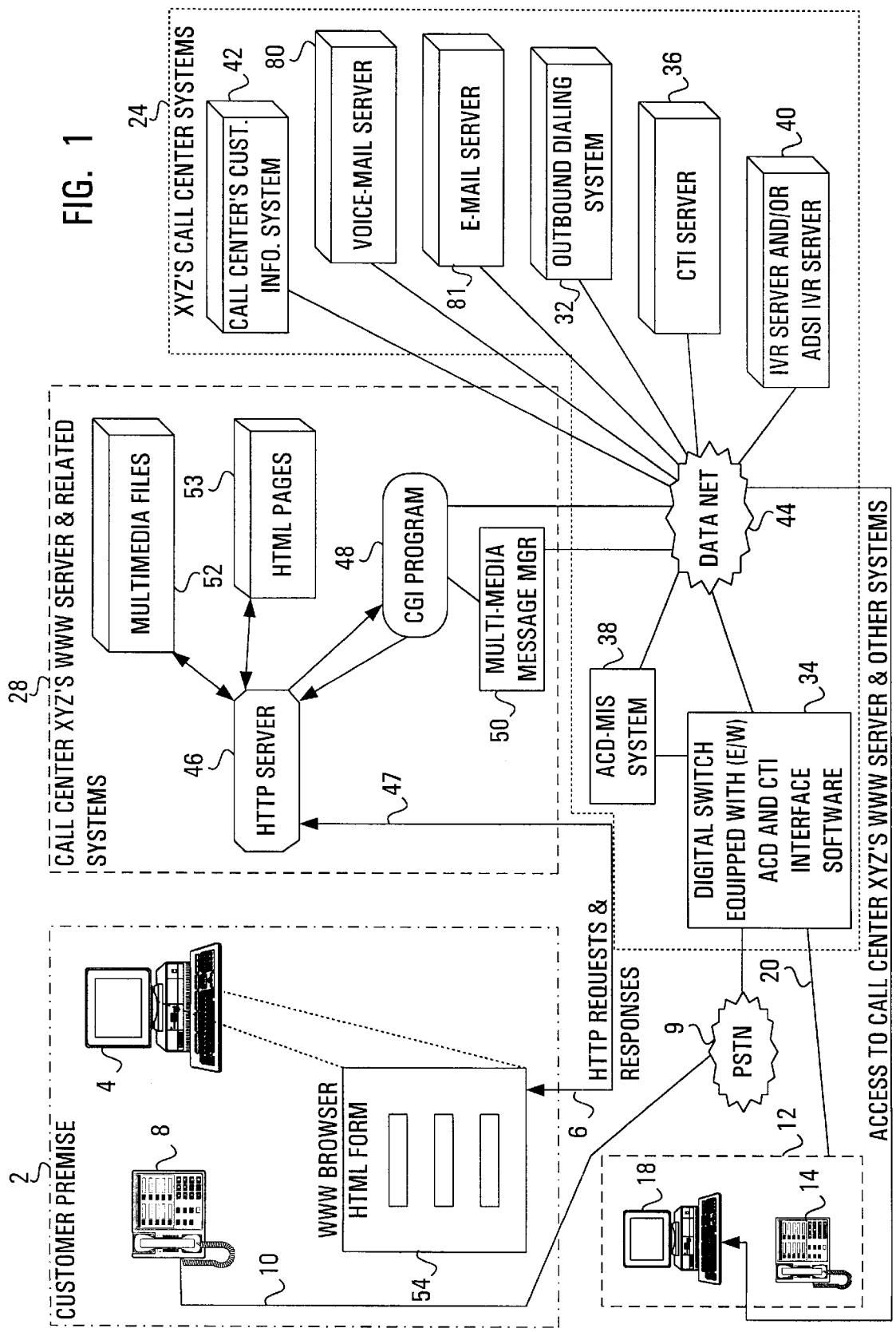
FIG. 1 shows a block diagram of the first embodiment of the invention.

In a first preferred embodiment of the invention, illustrated schematically in FIG. 1, a method and apparatus, herein referred to as the Customer Contact Channel Changer, is provided for automatically providing a live telephone connection between a customer using an organization's multimedia services to the organization's ACD agent. Four main components are illustrated, these being the customer premises 2, an ACD agent workstation 12, a call centre 24 and the call centre's multimedia server 28. The multimedia server 28 may be a WWW server 28, and will be referred to herein as such. The call centre's 24 WWW server 28 may actually be located at the call centre, or it could be located remotely. Likewise, the ACD agent workstation 12 may be located in the call centre. Alternatively, the ACD agent workstation may be in locations remote from the call centre such as in an individual agent's home or remote workplace.

The components of a customer premises 2 are illustrated in FIG. 1. This includes a processing platform and display such as a PC 4 capable of supporting a graphical WWW HTML (Hypertext Markup Language) browser and supporting generation of a URL (Uniform Resource Locator) of the organization's product and service database, an Internet line 6 (either via LAN or WAN-dial-up via modems), and a telephone 8 connected to the PSTN (public switched telephone network) 9 via a telephone line 10. The URL provides a snapshot indication of where in the hypertext environment of the organization's WWW services the user is at a given time.

Numerous commercial WWW browsers are available to assist in navigation through the Internet and WWW servers. These browsers use HTML and HTTP (Hypertext Transport Protocol). In a typical page received via the Internet from an organization providing information or services on a WWW server, words or key phrases may be underlined or bolded to indicate that more information is available. This is referred to as hypertext. If the user is interested in obtaining this additional information, he can click on the word with a mouse, and the additional information is displayed.

The typical configuration for an agent workstation 12 is also shown in FIG. 1. An agent workstation 12 is equipped with an ACD telephone set 14 from which a variety of calls can be answered, a Personal Computer 18 capable of supporting a graphical WWW/HTML browser, a telephone line 20 and computer communications line 22 for communicating with the call centre 24 and the WWW 28 via a data network 44 comprised of either a LAN (local area network) or via a dedicated or dial-up WAN (Wide Area Network). Typically a plurality of agent workstations 12 would be employed, depending on the volume of business to be handled.

The call centre 24, which handles requests for help from customers after they are received by the WWW server 28, subsequent call back of customers, and live connections with ACD agent workstations 12, is also depicted in FIG. 1. The call centre 24 includes an outbound dialing system 32 capable of setting up a blended inbound/outbound call environment. This outbound dialing system 32 contains a HOTLIST of telephone Numbers of HOT leads (qualified or interested leads) which are to be called as soon as an agent becomes available or at a time preferred by the customer. The call centre 24 also includes an ACD system 34 (on a digital switch—either PBX, centrex or computer based) which makes the actual calls and via line 20 connects the calls from the agent 12 to the customer via the PSTN 9 and line 10. It may also include a CTI server 36, an ACD-MIS (ACD management information system) system 38 connected to the ACD system 34, an IVR server 40, a call centre customer information system 42 and a data network 44 for interconnecting various components of the call centre 24.

The WWW server 28 (complying to HTTP and HTML) is equipped with information pertaining to an organizations products and services, directory information, etc. The server 28 includes an HTTP server 46 connected to an Internet access line 47 for receiving requests for help, and CGI (Common Gateway Interface) programs 48 for communicating with the call centre 24. It may also include a multimedia message management system 50 which will be described in detail below, and a store of numerous text, graphics and multimedia files 52 in various multimedia file formats (such as GIF, JPEG, MPEG, WAV, AUPCX, PDF, POSTSCRIPT). Not shown between the customer's Internet access line 6 and the WWW server's Internet access line 47 is the Internet itself.

Figure 2:
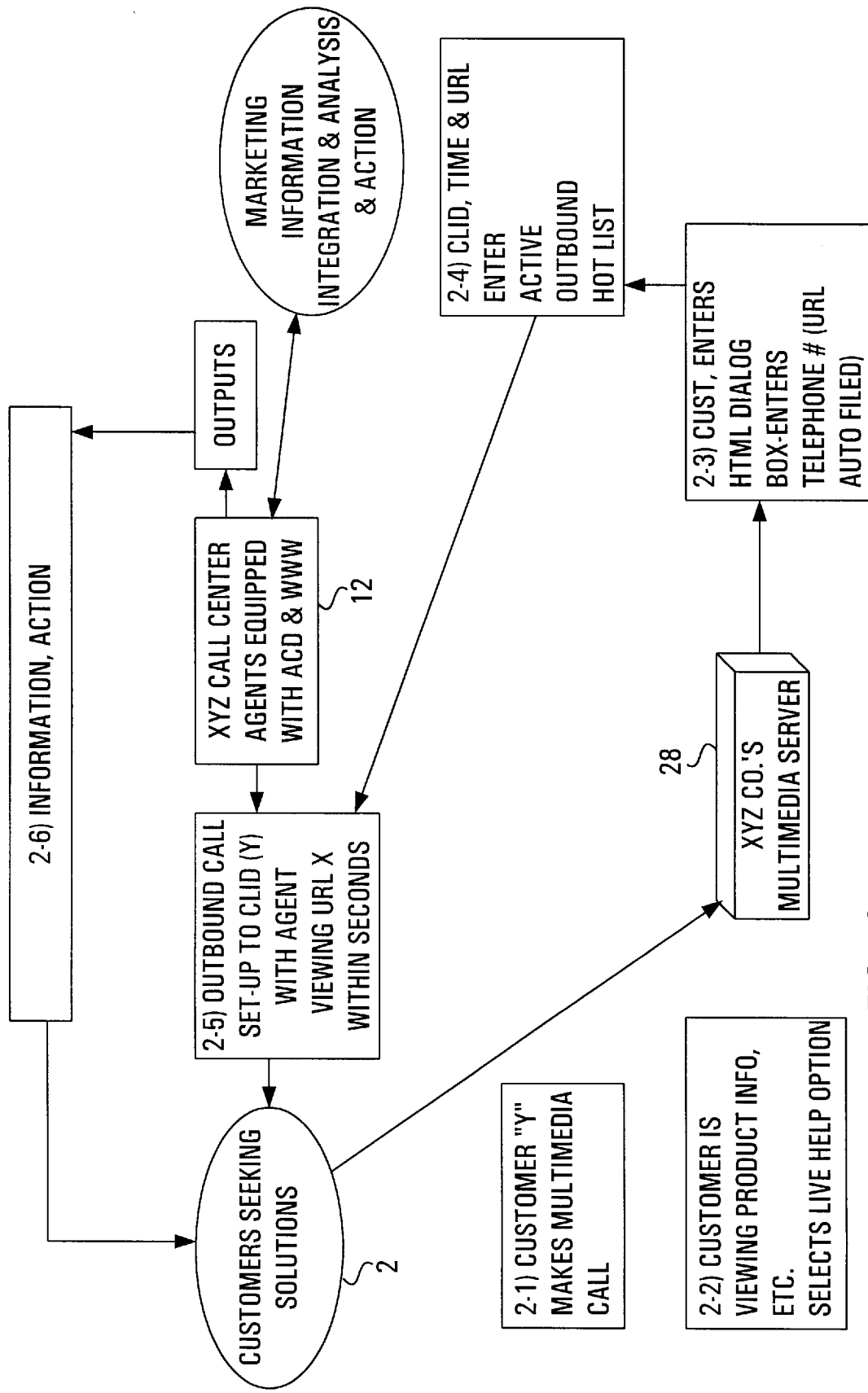
FIG. 2 shows a process flow diagram for the first embodiment of the invention.

A typical session will be described with reference to FIGS. 1 and 2. Process steps are contained in boxes in FIG. 2. The session starts when a customer 2 calls via its Internet access line 6 into the WWW server 28 and commences a self-serve session with an organization which subscribes to Customer Contact Channel Changer service (box 2-1). The customer browses through information regarding products and services with the graphical WWW browser. This browsing is often achieved by viewing HTML pages 53 and associated multimedia files 52. There may be on-line help which addresses some questions which may arise. At some point additional details or assistance are needed and the customer chooses a "Live Help" option from within an HTML page (box 2-2).

This may be done by using a mouse to click on a "Live Help" button on the screen, or by entering a command at the keyboard. This prompts an additional HTML form 54 to pop up which the customer must fill in (box 2-3). The form 54 asks the caller for the phone number at which they can be reached at that time. The URL which the customer was viewing (prior to selecting help) is automatically filled in to indicate the page from which help was requested, but the customer also has the option of providing a different URL. In one embodiment, the customer also has an option of specifying a preferred time to be called back with the default being to request call back as soon as possible. The customer then sends this completed HTML help request off to the WWW server 28 where it is received by the HTTP server 46 and time-stamped. The request may be sent by either E-mail or TCP/IP (transmission control protocol/Internet protocol) client to server HTTP interaction etc.

At the call centre 24, the help request messages are received and initially processed by the HTTP server 46. The telephone number, time stamp and URL are passed to the outbound preview dialing system 32 in the call centre 24 via the CGI interface 48 and data net 44. Should agents not be available, messages may be sent back via the CGI interface 48 and HTTP server 46 to the customer with anticipated wait time (derived from the ACD-MIS system 38) and call setup and scheduling options may be presented to the customer in conjunction with the multimedia message management system 50 to be described further below. An active time-stamped HOTLIST is maintained to feed the outbound dialing system 32 with numbers to call while also providing the next available agent the URL of where the question arose. The information received from the customer, including a CLID (caller identity) which is the 10 digit customer phone number, and the URL is entered on this HOTLIST (box 2-4). The agent workstation computer 18 is set up to preview the HTML page associated with the caller's URL before or while the outbound call is being made. This allows the agent to be better prepared to answer the question(s) which may arise. The call is then made to the customer automatically without any need for the agent to key any telephone numbers into either their phone 14 or computer 18 (box 2-5). After the customer answers the phone call from the agent, the two parties will be in full voice communication and will be viewing the same multimedia screen which prompted the customers question. The agent can then assist or guide the caller to the solution or answer sought, or can take orders and/or provide technical support (box 2-6).

In a modification of this embodiment, the customer is not required to fill out an HTML page. Upon selection of the "Live Helps" option, default values together with the relevant URL are filled in automatically, and the request is immediately sent off.

Figure 3:
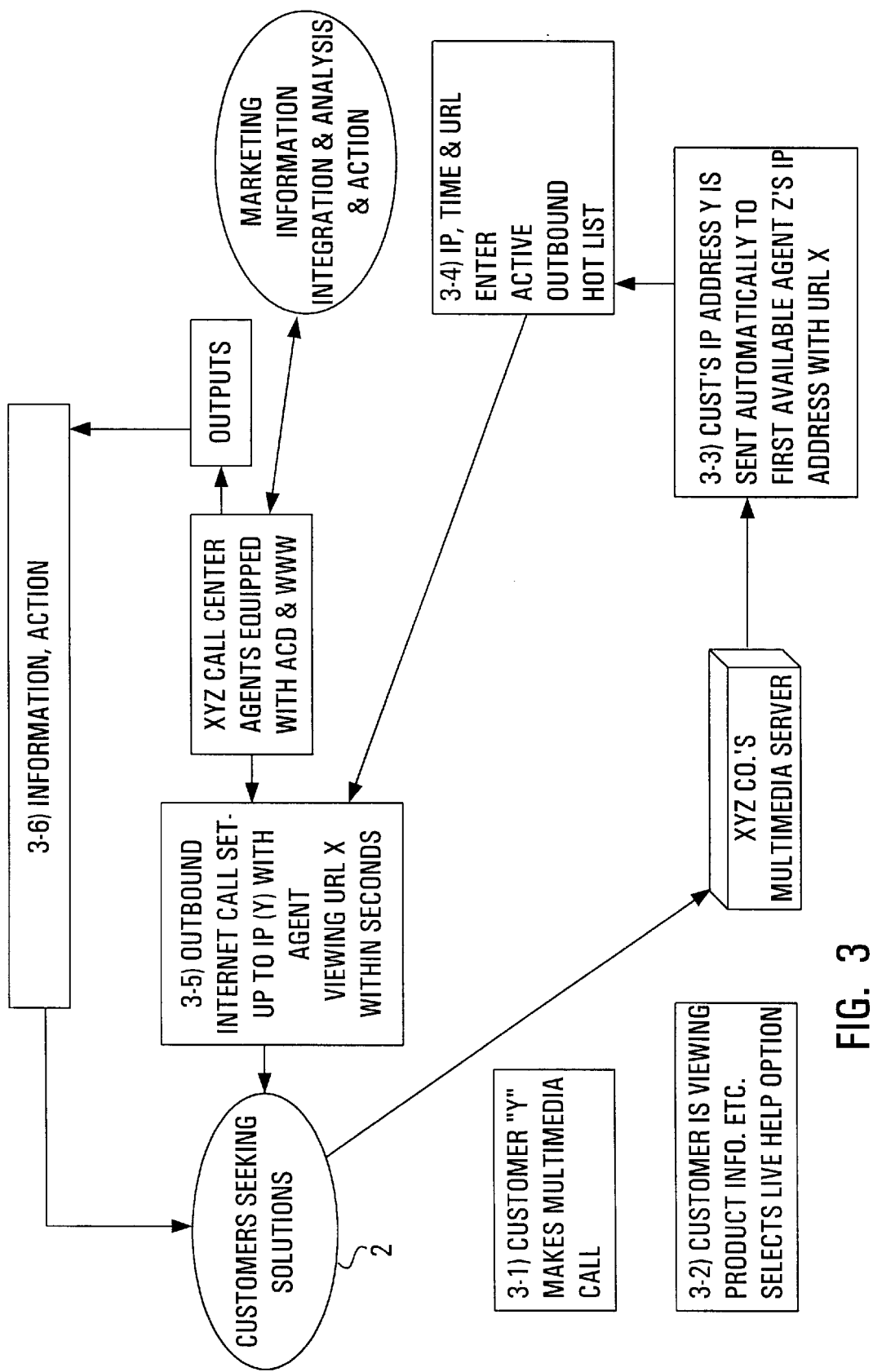
FIG. 3 shows a process flow diagram for a variation of the first embodiment of the invention.

When it is desired to establish voice communications over the data network rather than the PSTN, instead of sending a telephone number at which the user can be reached, an HTML form including the user's IP (Internet protocol) address and URL is filled in automatically and forwarded to the outbounding system through the same channels as before. The process diagram for this is shown in FIG. 3. The rest of this process is similar to that described above except that the outbound call is placed over the Internet using IP based voice communications packages running on the user's PC enabling voice communications. These use originating and terminating IP addresses to set up virtual (packet based) circuits for use as voice channels for the duration of the call. This assumes that the caller and agent have compatible hardware and software configurations on their PC's.

When the option is provided to the customer of selecting a time preferred for call-back, a more sophisticated message management system is required. For this purpose, the invention provides a method of managing the integration or connection of customers using various services (WWW servers, voice-mail, IVR, e-mail, etc) to an ACD call centre agent. This multimedia message management system 50 will be referred to herein as the "Multimedia Message Manager" (MMM) 50.

Figure 4:
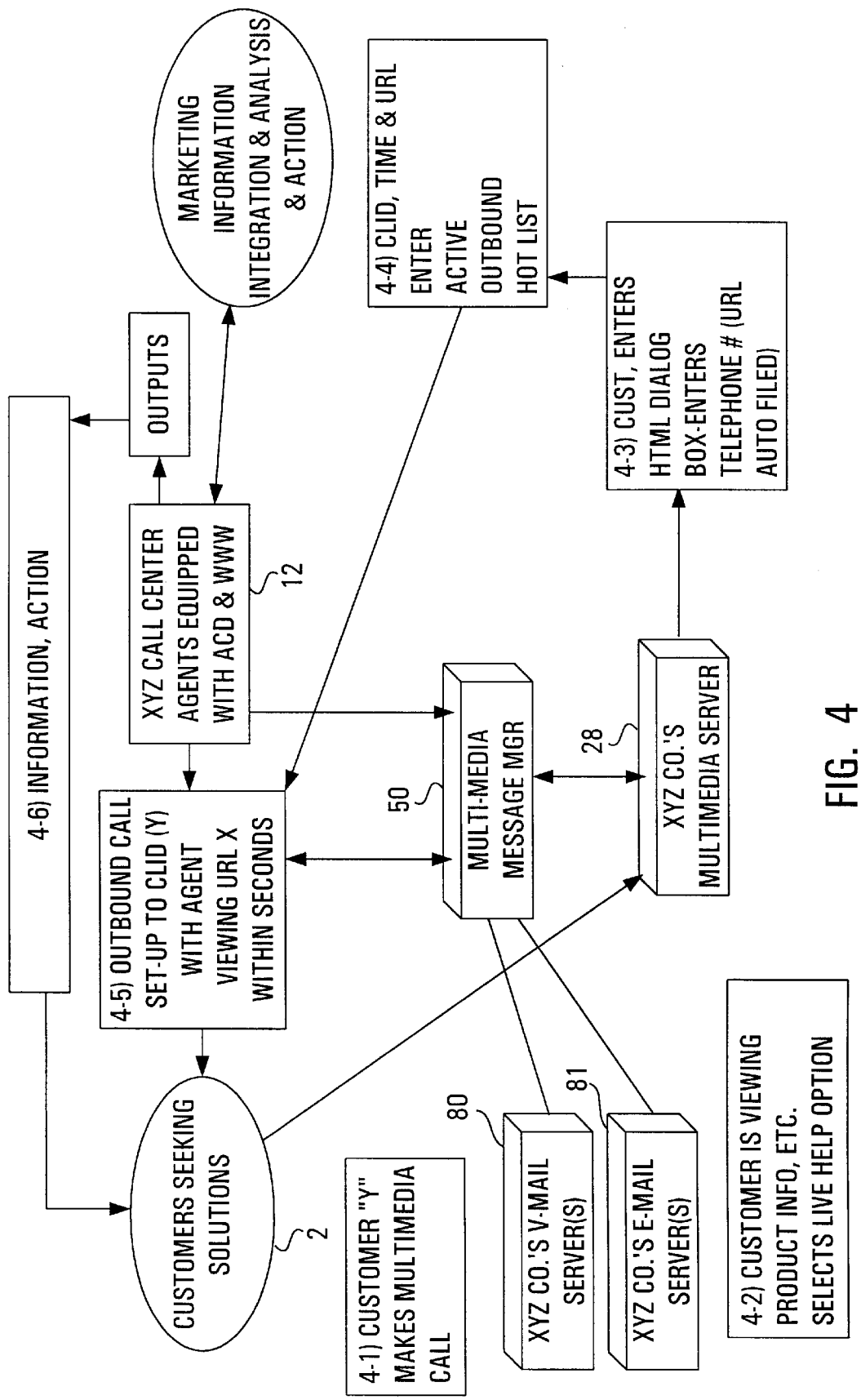
FIG. 4 shows a process flow diagram for another variation of the first embodiment of the invention.

A process flow diagram which incorporates the MMM 50 is shown in FIG. 4. This figure is very similar to FIG. 2 with the exception of the addition of the MMM which is connected to the organization's V-mail servers 80 and E-mail servers 81 and the WWW server 28.

The MMM 50 acts as an intermediary between the traditional call centre related systems and the new WWW related server systems. Specifically, it communicates with the call centre ACD-MIS system 38 to get estimated anticipated caller wait times (or other parameters) and passes this information to the caller via the HTTP server 46 and related CGI programs 48. It may be used to allow Web browsing of information sources related to the call centre such as the voice mailbox associated with a call centre agent. Overflow calls may be routed to voice mail. The MMM 50 allows the agent or supervisor to scan large volumes of voice-mail messages, E-mail messages, WWW form request etc. and prioritize and schedule call backs from a combined HOT-LIST.

The MMM 50 acts as a clearing house point to assist in scheduling calls between customers and ACD agents and vice versa. This allows customers who may not be able or willing to converse with an agent at Time T0 to schedule the call for Time T2 which is the customer's preferred time. The HOTLIST is then updated to include both calls which are to be completed as soon as possible and calls which are due to be completed in the very near future. There are many ways in which the HOTLIST may be maintained. Calls requesting immediate call back can be ordered according to the time stamp of when they were received, which will always be in the immediate past. Calls with future time stamps may be appended to the list prior to the arrival of the time indicated by the future time stamp, or alternatively, they can be given priority and placed at the top of the list when the time arrives. The MMM 50 also handles the notification through the E-mail servers 81 of customers of the fact that delays are expected, and is able to provide an indication of when a return call might be expected.

Figure 5:
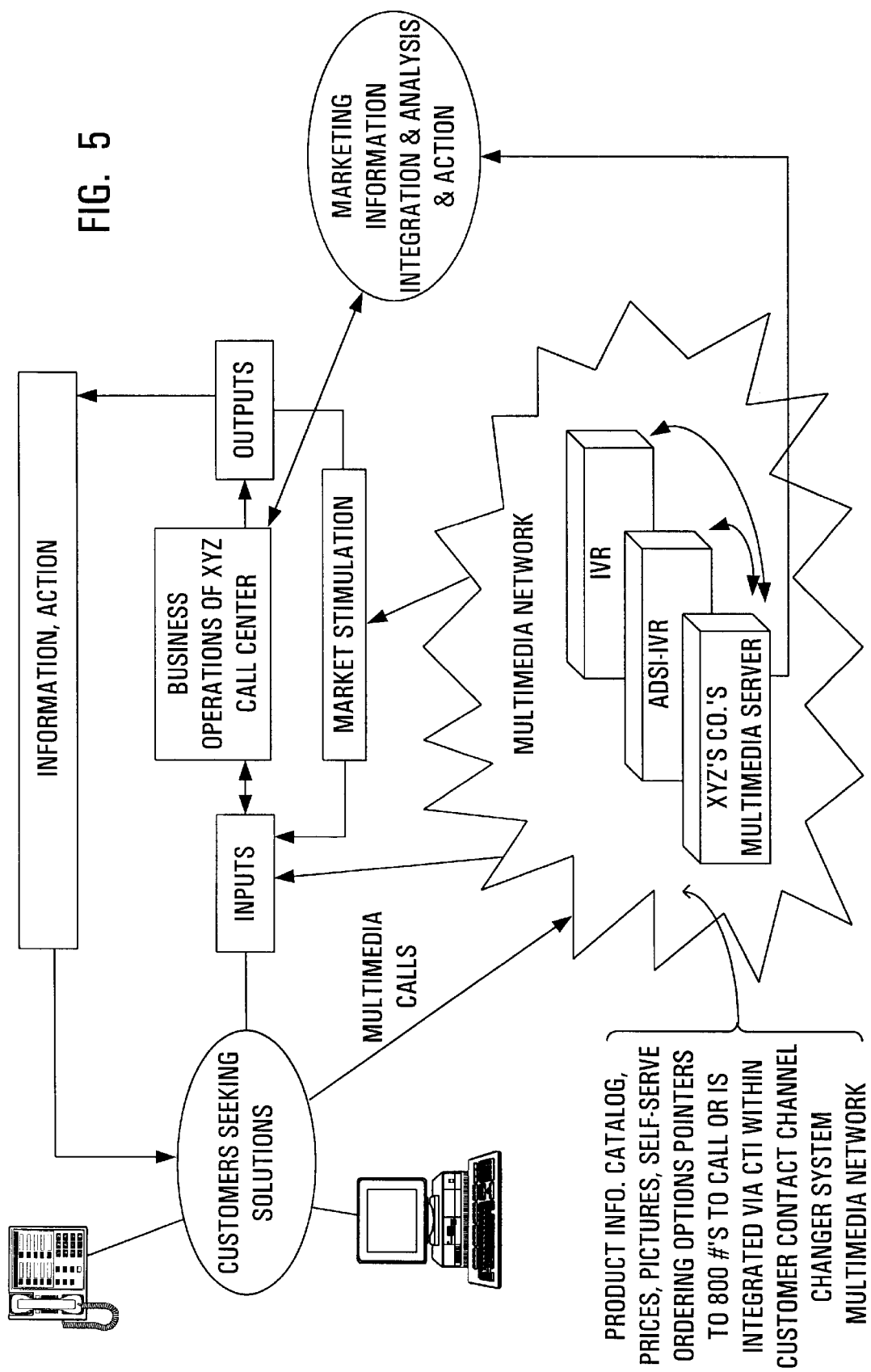
FIG. 5 shows a process flow diagram for another variation of the first embodiment of the invention.

Alternative to connecting a multimedia user to a live agent, with a slight modification of the first embodiment described above the invention can be used to connect a multimedia user (WWW, voice mail, IVR, E-mail) to an IVR call back system, in which help is available on a variety of topics, and in which the user further has the option of being connected to other ADSI enhanced IVR applications such as home shopping systems. This is illustrated in FIG. 5. This is particularly useful in situations where a portion of the call centre's business may have self service options in different mediums. For example, both IVR self service channels and WWW self service channels might be available, and this aspect of the invention allows a quick change from one medium to the other. By selecting the IVR channel, the customer is connected to the IVR channel in an outbound manner as above.

Figure 6:
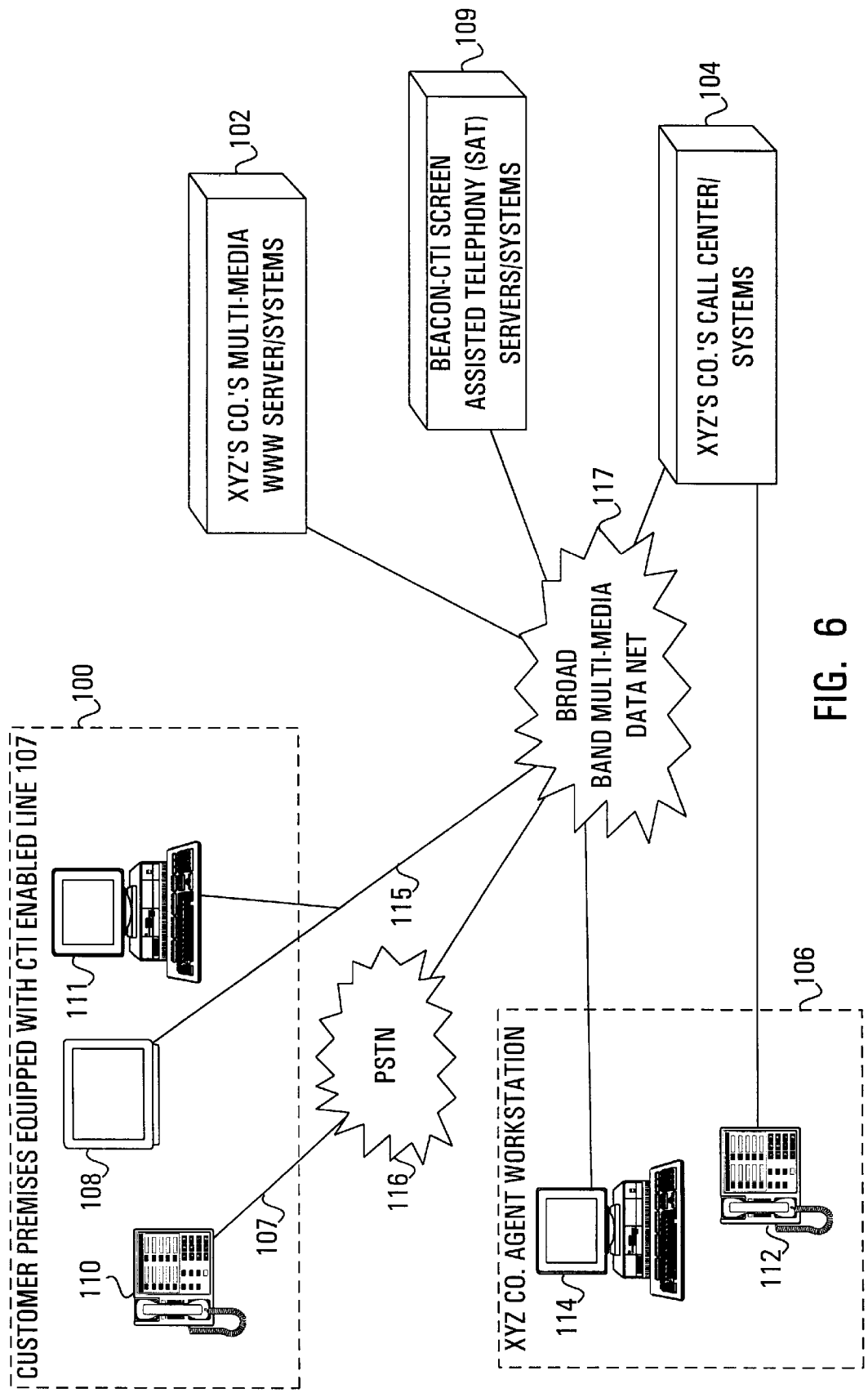
FIG. 6 shows a block diagram of the second embodiment of the invention.

FIG. 6 illustrates a second embodiment of the invention. While the first embodiment and its modifications described above are directed towards call centres equipped with outbound calling capabilities, in this second embodiment, the call centre is equipped with inbound call processing capabilities, handling calls as they come in from customers. This provides a method for integrating or connecting a customer who has a SAT (screen assisted telephony) capable configuration and wishes to be connected to a live agent 106. The figure is very similar to FIG. 1, but with much of the detail of the call centre and WWW server removed. There are again four main components illustrated, one of these being the customer premises 100 equipped with a telephone (or a screen assisted telephone set) 110 and line 107, a set-top box (a special purpose computing device which allow access to network services through the television set with user input being achieved through the television remote control) and TV 108 or PC 111, and a CTI/SCAI (switch to computer application interface) enabled line 107. The other main components include the multimedia or WWW server 102, call centre 104 and an agent workstation 106 equipped with a computer 112 and a telephone 114, or a screen assisted telephone. Also shown is the PSTN 116, a broad band multimedia data network 117 and a SAT server 109.

The interconnections between the customer premises 100, WWW server 102, call centre 104, agent workstation 106 and PSTN 116 are the similar to before with the exception that all customer PC connections are via a broadband data network 117, and the customer telephone 110 connection is implemented with a line 107 to the PSTN 116 and a subsequent connection to the broadband data network 117.

Figure 7:
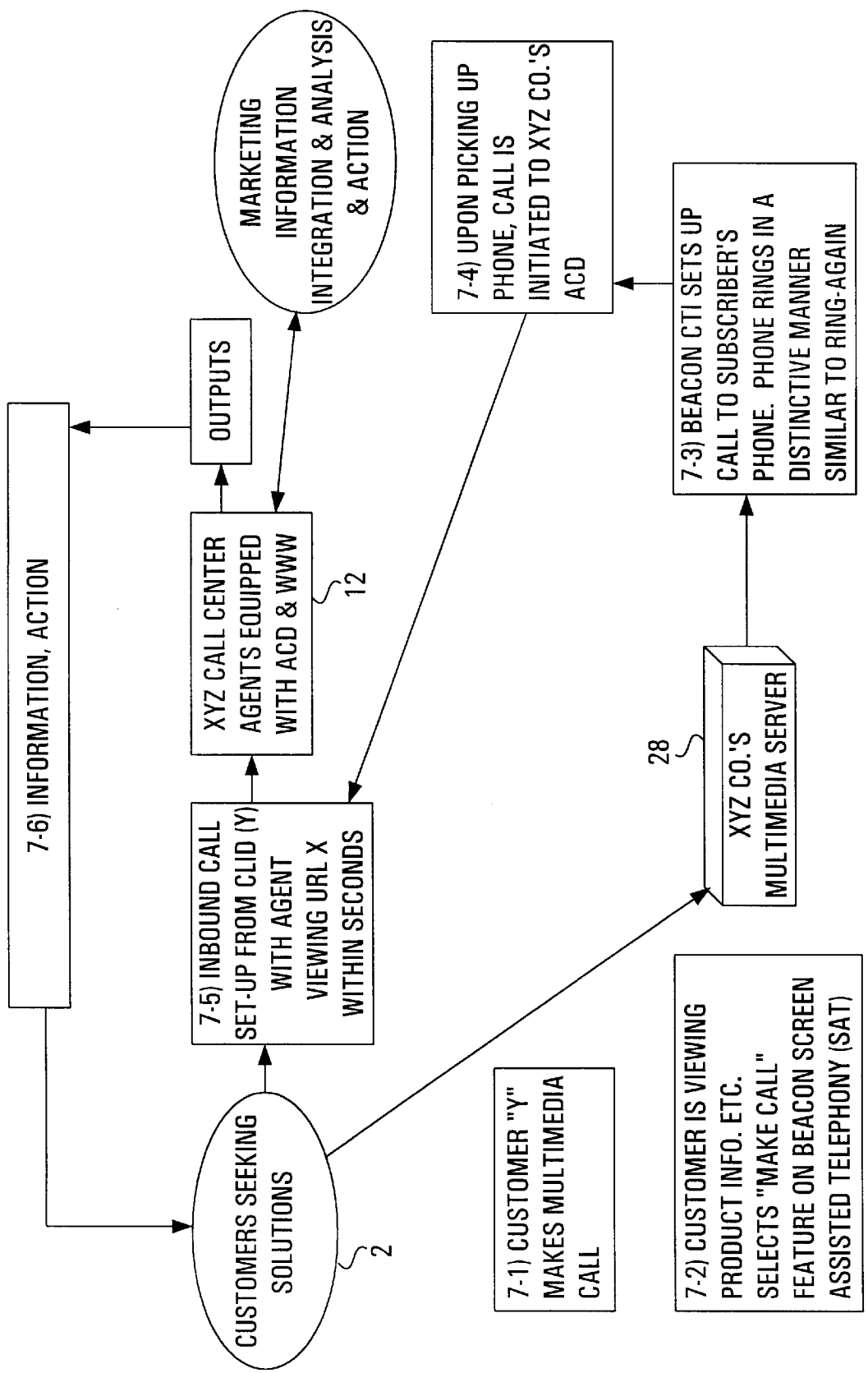
FIG. 7 shows a process flow diagram for the second embodiment of the invention.

The process followed in the second embodiment will be described with reference to FIGS. 6 and 7. The box numbers refer to boxes shown in FIG. 7. Initially, the customer makes a "multimedia call" in order to be connected to XYZ's multimedia server 102 and to run a multimedia application on the set-top box/TV 108 or PC 111 (box 7-1). The user selects on the set-top box remote or the PC mouse a "MAKE CALL" feature from within the multimedia application (box 7-2). This selection initiates a series of steps to set up a call to either an ACD group or an individual. The request first signals through the broadband multimedia data net 117 to a PSTN telephone switch 116 specially equipped with CTI techniques (such as SCAI) to ring the customer's line 107 (with a distinctive ring similar to ring-again) prompting the customer to pick up the handset (box 7-3). The PSTN based switch 116, having sensed that the customer has indeed picked up the set, then dials the destination party automatically, which in this case is the call centre 104, where an ACD system distributes the call to an ACD agent workstation 106 (box 7-4).

When an ACD agent answers the call, the customer's URL and/or CLID are forwarded so that a customer relevant screen is appearing on the agent's PC or terminal 114 at the same time (box 7-5).

The customer relevant screen is set up on the agent's screen via one of several known CTI techniques. These include first party call control techniques and third party call control techniques. First party call control techniques use various CLID (Calling Line Identification—not shown) boxes and associated screen-pop software. The CLID is transmitted over the telephone line and the CLID box detects this and passes it to the agent's PC over a serial RS232 communications port. The CLID box may be integrated as a part of the telephone, or it may be a standalone unit connected to the telephone line together with the telephone. Screen-pop software takes the telephone numbers provided by the CLID box and looks up the corresponding customer records in a database, and displays them on the screen. Alternatively, using third party call control techniques, the digital switch has a shared data circuit to a "Third Party" CTI server which understands a common protocol such as SCAI. This server then associates various calls with various agents and delivers CLID and/or customer relevant data to the agents workstation as the phone is ringing.

Under either of the scenarios described above for transmitting the CLID, the URL information is transmitted in one of two ways. Firstly, upon answering the call and viewing the customer relevant data simultaneously (obtained by looking up the CLID in a customer database), the agent greets the caller and the caller verbally mentions the associated product or subject matter area which causes the agent to hot key to the relevant or related HTML page. A more sophisticated alternative to this is for the WWW server to sense all users querying it in real time (i.e. which URL's are being read and from which IP addresses or E-mall addresses) and then do a look-up into its database to determine corresponding CLID's. As calls from CLID's come in, the database can correlate the associated caller and URL.

Should all agents be busy, an IVR system can be used to provide additional information options to the customer while an agent becomes available. This method does not avoid ACD queues, but does make placing the call easier. In addition, the use of the URL and/or CLID makes the provision of help by the agent more efficient. As in the first embodiment, the agent is now in a position to help the customer with the WWW server or other multimedia application with which they require assistance (box 7-6).

As in the first embodiment, instead attempting to put the call through to a live agent, the call can be automatically connected to an IVR system. Screen-based telephony and associated SAT telephone switches may be employed in this case, allowing the customer to interact with an ADSI enhanced IVR system.

Figure 8:
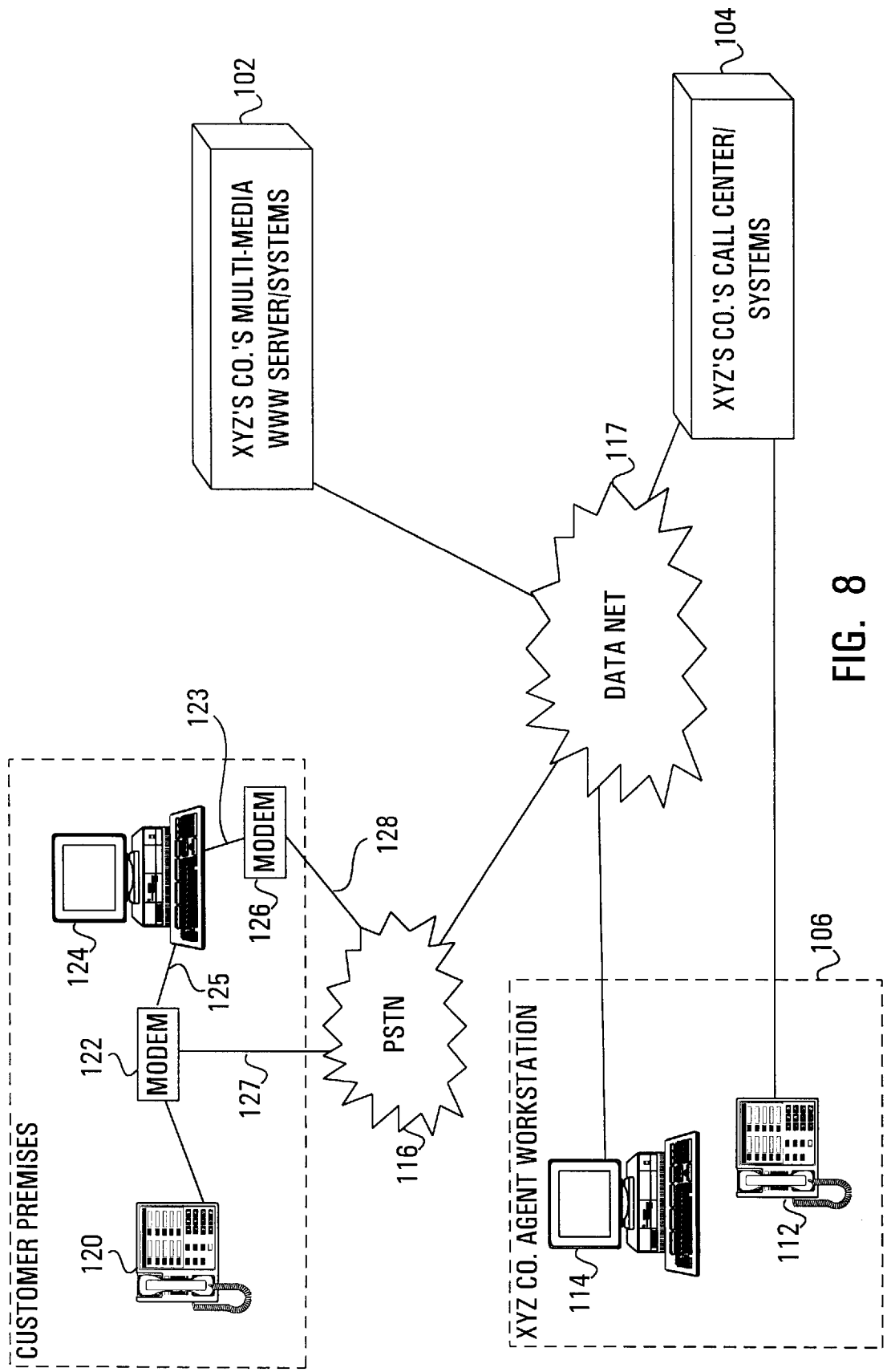
FIG. 8 shows a block diagram of the third embodiment of the invention.

FIG. 8 illustrates a third embodiment of the invention which is quite similar to that shown in FIG. 6, with the exception of the configuration at the customer premises. Again, an inbound call processing capability is required at the call centre, as in the second embodiment. This embodiment provides a method for integrating or connecting a customer 100 who has a telephone 120, a PC 124 with DDE (dynamic data exchange ) capabilities and two modems 122,126 and lines 127,128 and wishes to be connected to a live agent 104. DDE allows data to be passed dynamically between different applications running on the PC. In this embodiment, the PC 124 is equipped with communications software and modems 122, 126 able to place the call between the customer's telephone 120 and the ACD agent itself, automatically, instead of requiring the telephone switch to set up the call as in FIG. 6.

Figure 9:
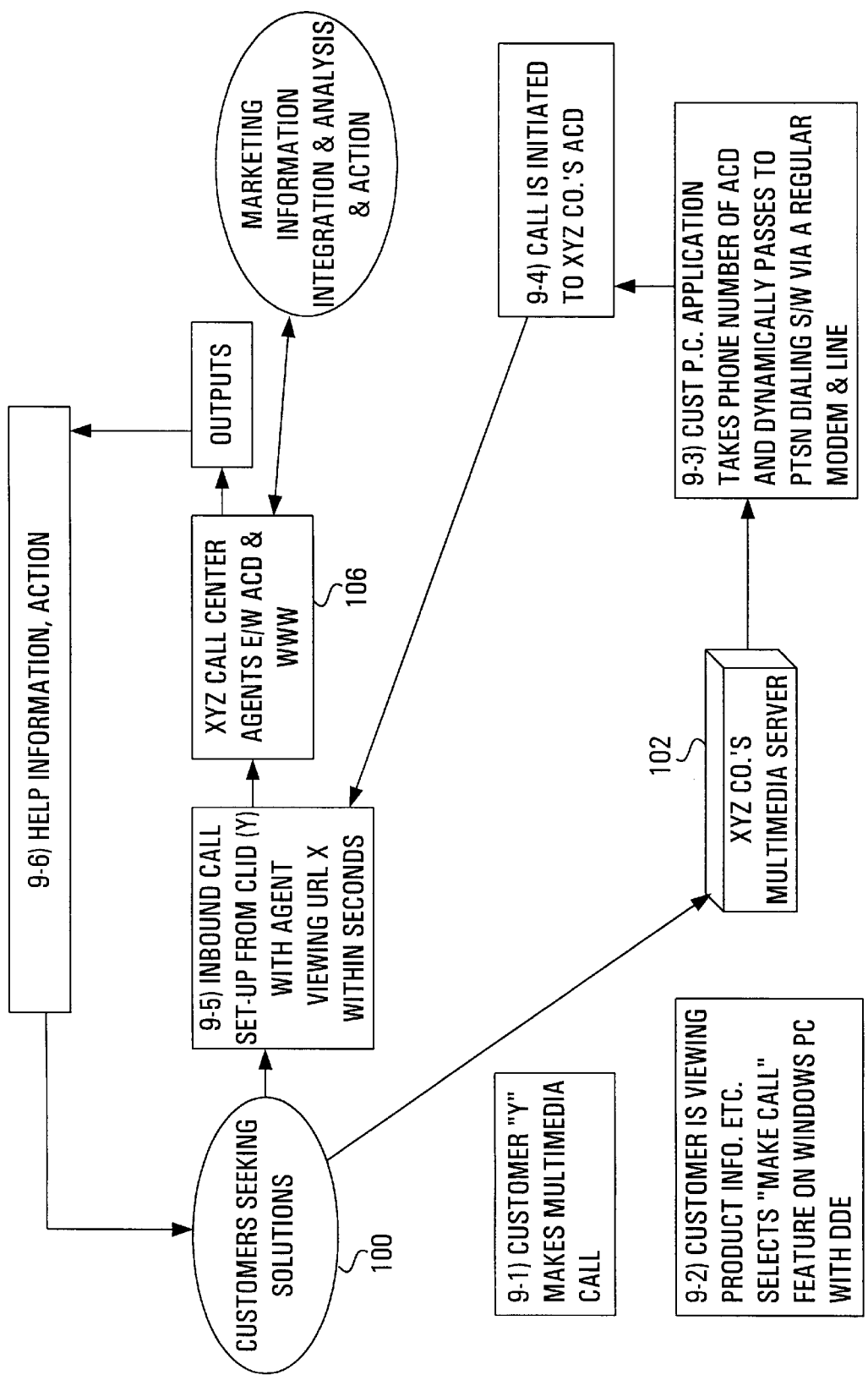
FIG. 9 shows a process flow diagram for the third embodiment of the invention.

FIG. 9 shows a process diagram showing the steps which occur when this method is used. Initially, the customer makes a multimedia call to connect to company XYZ's multimedia server (box 9-1). The customer then selects the "MAKE CALL" or "HELP" button which may appear on an HTML page (box 9-2). The customer request initiates a PC based DDE whereby the telephone number in the HTML page to be called is passed dynamically to another PC based communications software package where an outbound call is dialed over a regular modem 122 and line 127 (boxes 9-3 and 9-4). When an ACD agent answers, a voice connection between the customer's telephone 120 and the ACD agent's telephone 112 is completed, and a customer relevant screen is appearing on the agent's PC 114 or terminal at the same time (box 9-5) based on incoming CLID and using first part or third party CTI techniques as described previously.

As before, an IVR connection could be established instead of using live agents, and screen assisted telephones and associated servers could be employed to enhance this type of connection.

Figure 10:
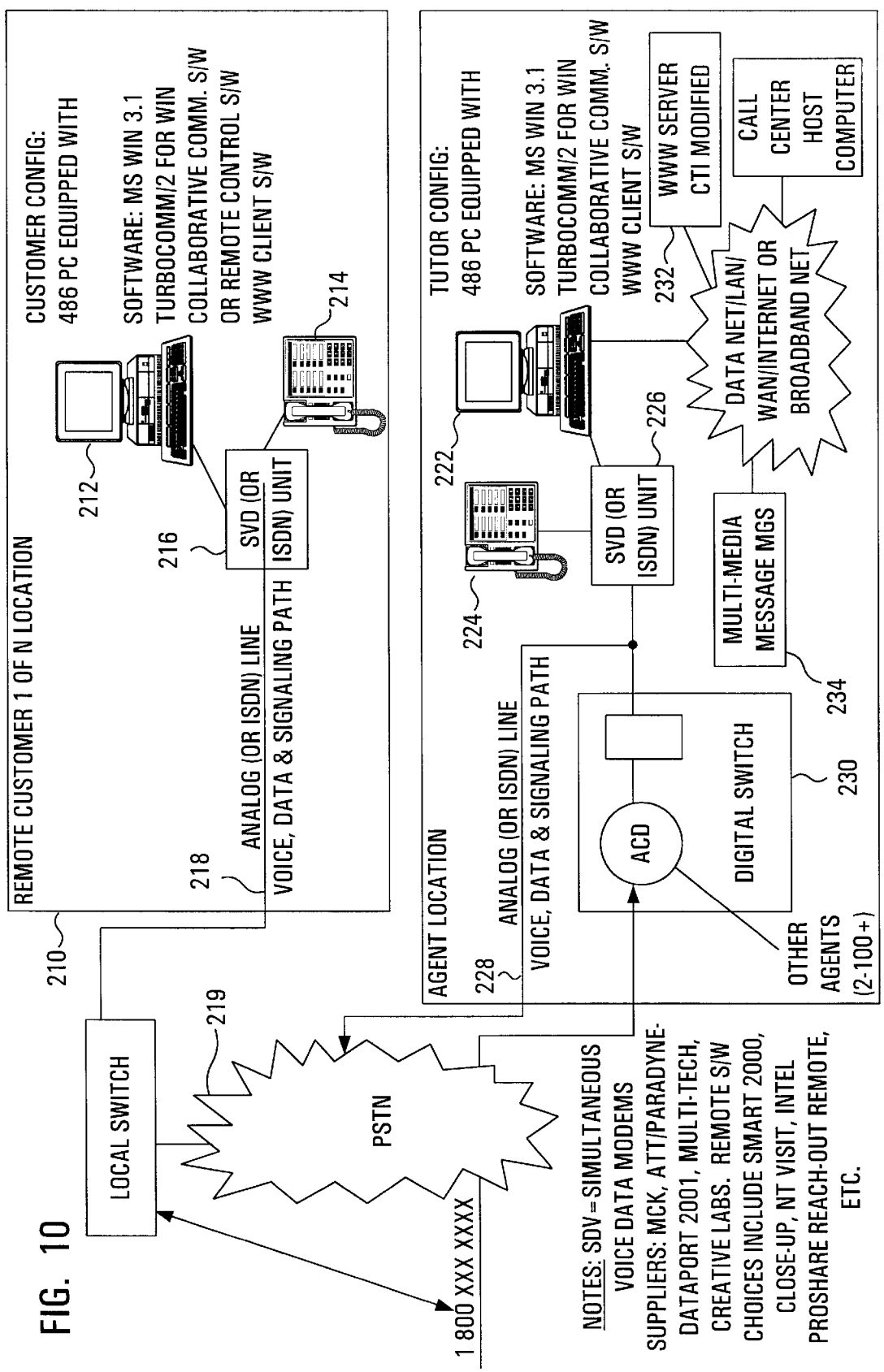
FIG. 10 shows a block diagram of the fourth embodiment of the invention.

FIG. 10 illustrates a fourth embodiment of the invention in which a method and apparatus is provided for integrating WWW information from a caller who is already talking to a live ACD agent. In this embodiment either an inbound call processing capability or an outbound call processing capability is required at the call centre.

The customer site 210 is equipped with a computer 212 and a telephone 214 both connected to a SVD (simultaneous voice data) modem 216 with external connections 218 to the PSTN 219 which may be analog, or ISDN (integrated services digital network) format. SVD modems allow both voice and data to be transmitted over the same standard telephone line at the same time.

The agent site 220 is similarly equipped with a computer 222, telephone 224 and SVD 226 and connections to the PSTN 219. It is also connected to a digital switch 230 with ACD functionality for distributing calls to various agents. The agent's computer 222 is also connected to a WWW server 232 and may be connected to a multimedia message management system 234.

Figure 11:
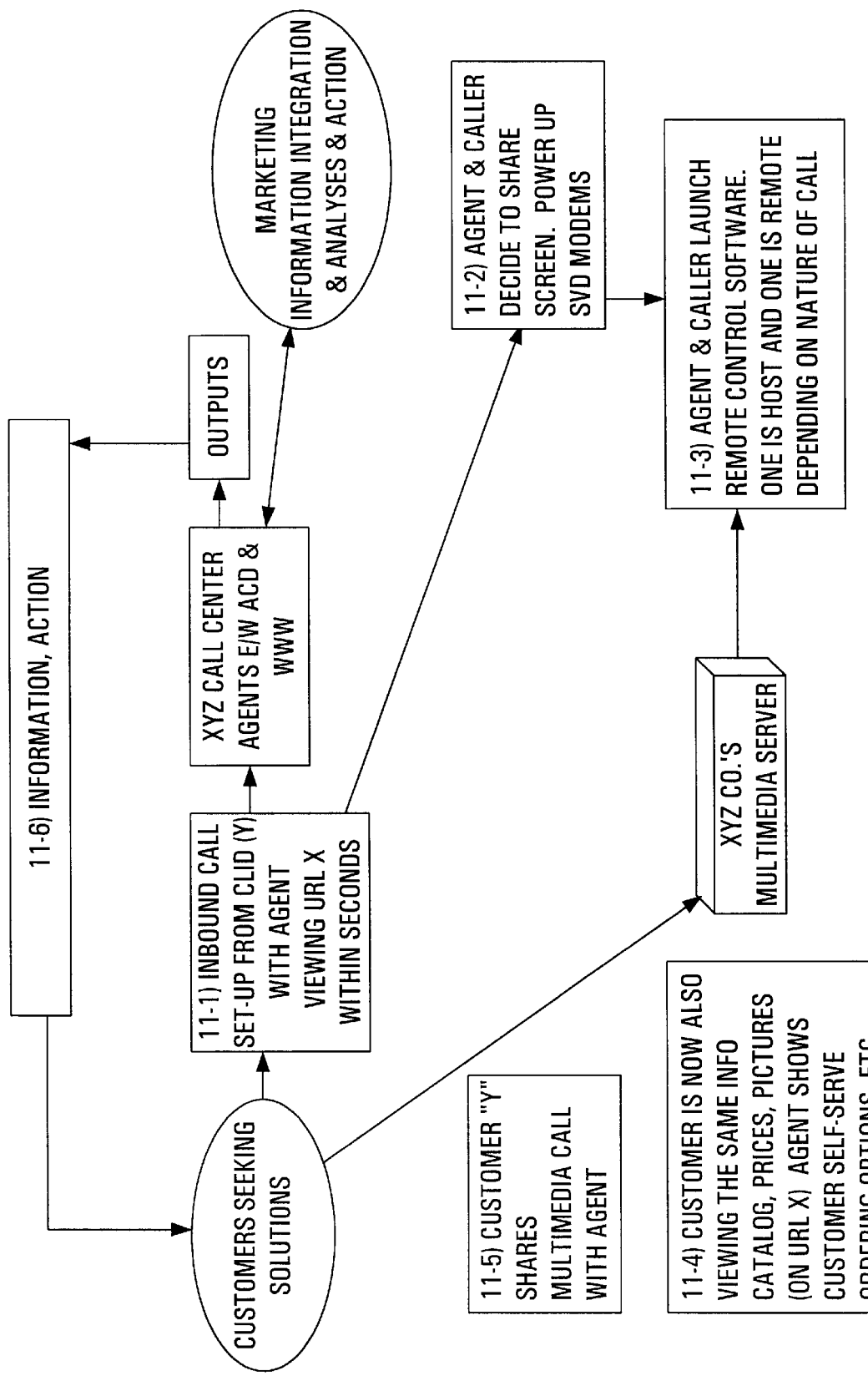
FIG. 11 shows a process flow diagram for the fourth embodiment of the invention.

The process flow diagram for this embodiment is shown in FIG. 11. The customer has been previously connected to an ACD agent either according to the traditional method wherein the customer physically dials an 800 number, or according to one of the methods described above (box 11-1). This includes all of the inbound and outbound call set-up methods and associated hardware described in the first three embodiment and their variants, although it is assumed that a live agent exists, and not an IVR system. Both parties are conversing and desire to be viewing identical screens of information simultaneously, and so decide to go into collaborative mode (box 11-2). This may be due to the fact that simple verbal explanations are insufficient to solve the caller's problems. If the calling party is not yet WWW connected, the two parties activate their SVD Modems 216, 226 (or ISDN units) and activate their remote control software packages (box 11-3). This sets up a data connection over the same telephone line as they were previously using for voice. Then voice and data can be transmitted over the same telephone line. The agent who is already connected to the desired WWW server 132 acts as HOST and the caller acts as a REMOTE allowing the caller to view the same WWW pages (or other Information Systems) as the agent (box 11-4). The agent can then walk the customer through information and supplement it verbally, thereby sharing a multimedia call with the customer (box 11-5). Screens appearing on the agents computer appear on the customer's computer, as what the customer sees is an exact duplicate of what the agent sees. This may result in immediate sales and service or assist in further sales and service. The next time the caller, having become more comfortable and familiar with the system, may opt to use the self serve channel with no human assistance for increased likelihood of repeat business. The above combining of ACD, SVD and WWW building blocks allows collaborative screen sharing between customers and ACD agents. In addition, agent integration via the MMM 234 allows increased agent productivity.

If the caller is already logged onto the WWW server, he must disconnect before being able to go into collaborative mode, unless he is equipped to handle two connections at once.

In order to implement this embodiment, several configuration (hardware and software) modifications to existing ACD setups would be required. Most current PC's will not successfully support high speed (14.4 KBPS) communications on their serial ports due to the older UART (Universal Asynchronous Receiver Transmitter) chips. Communications with these units is error prone and unreliable. PC's need a smarter faster UART to make this configuration reliable. These are supplied by installing high speed serial input/output boards in the ISA (Industry Standard Architecture) slots on the motherboard of the PC. Software reconfiguration is required to disable the lower speed communications ports. An alternative here it to use new simultaneous voice and data modem technology which utilizes the parallel port of the PC which (for most PC's) currently supports speeds equal to or greater than 28.8 KBPS.

At the agent end, the type of line choice (2500-type analog ACD line or digital ACD line) must be made and depending on this additional hardware and software is required. If a digital ACD line is used, a hardware adaptor is required to convert the digital signaling which may be proprietary in nature into signals recognized by analog based SVD modems. Also, these adaptor units must be modified to handle high speed (14.4 KBPS) data transmission. If 2500-type analog lines are used, software is required on the PC to allow easy access and use of sophisticated feature activation codes. The line choice here depends largely on which features the call centre agent would be using.

We claim:

1. A system for providing help to a customer having a customer telephone with a customer telephone number and connected to a public switched telephone network, and having a display and a processing platform connected to the Internet, the system comprising:

a WWW server connected to the Internet for presenting a first WWW page to said display of said processing platform, said page including a remote help request option which may be selected by said customer;

a plurality of help agent computers connectable to said WWW server each having a respective help agent telephone connectable to said public switched telephone network, each help agent computer and help agent telephone being assigned to a respective live help agent;

said WWW server also being for receiving a remote help request and subsequently for presenting to said display of said processing platform a second WWW page containing a help request form, and for receiving a completed help request form containing said customer telephone number from said processing platform;

a call centre in communication with said WWW server to which said WWW server can communicate said completed help request form, the call centre comprising an automatic call distributor for placing a telephone call between an available one of said agent telephones and the customer telephone over the PSTN as a function of the help request form;

the system including means for automatically presenting said first WWW page on the computer associated with said available one of said agent telephones and for bridging the call between said agent telephone and said customer telephone when the customer answers the telephone whereby said first WWW page is present on said agent's computer when a telephone link between the agent telephone and customer telephone is completed.

2. The apparatus according to claim 1 wherein the request form further comprises a field for filling in a customer preferred time for call-back and wherein the call centre further comprises means for recording the requests and associated preferred call-back times, and is adapted to place calls at specified times according to the times in the recorded requests.

3. The apparatus according to claim 1 wherein the means for transferring the request to the call centre is one of TCP/IP HHTP or E-mail.

4. The system according to claim 1 wherein said means for automatically presenting said first WWW page on the computer comprises means for including a universal resource locator of the WWW page from which the customer selected live help in said help request form, and for forwarding this to said computer associated with said available one of said agent telephones.

5. A system for providing help to a customer having a display connected to a processing system which is connected to the Internet and displaying a first WWW page and a customer telephone having a handset and connected to a public switched telephone network, the system comprising:

a WWW server connected to the Internet for presenting said page on said display through said processing system, and for receiving a help request from said customer including the customer telephone number;

a plurality of help agent computers connectable to said WWW server each having a respective help agent telephone connectable to said public switched telephone network, each help agent computer and help agent telephone assigned to a respective live help agent;

a call centre in communication with said WWW server to which said WWW server can communicate said help request, the call centre comprising a switch for ringing the customer telephone with a distinctive ring and for detecting when the customer picks up the handset and for then placing a call to an available one of said help agent telephones.

6. The apparatus according to claim 5 wherein the request form further comprises a URL indicating the WWW page from which the customer has requested help and with which the agent computer can be set up at the same WWW page.

7. In a communications system comprising a server connected to the Internet, customer premises equipment in a remote customer premises comprising a customer computer connectable to the Internet and a customer telephone having a telephone number and connected to a public switched telephone network in a remote customer, a call centre and a plurality of help agent workstations each comprising a help agent computer and a help agent telephone connectable through the public switched telephone network to the customer telephone, a method for the customer to obtain help in relation to a WWW page having a URL (universal resource locator) from the server displayed by the customer computer comprising the steps:

a) the call centre monitoring the agent telephones for availability;

b) the customer selecting a remote help option from the WWW page;

c) the customer's computer preparing a help request form comprising the customer telephone's number and the URL;

d) the system transferring the help request form to the call centre;

e) the call centre setting up a call over the public switched telephone network between the customer telephone and an available one of the agent telephones;

f) the call centre passing the URL to the agent computer; and g) the agent computer displaying the WWW page identified by the URL.

8. The method according to claim 7 wherein the request form further comprises a field for filling in a customer preferred time for call-back and wherein the call centre attempts to set up the call at the customer preferred time for call-back.

9. The method according to claim 7 wherein the help request is transferred from the customer computer to the call centre through TCP/IP HTTP or E-mail.

10. The method according to claim 7 wherein a message is sent back to the customer with an anticipated wait time when no live agent is available for immediate help.

11. The method according to claim 7 in which the help channel is a live agent workstation comprising a computer and telephone, wherein the agent's computer is also provided with customer relevant information through the use of a caller identification system to identify the customer's telephone number which is then used to query a customer database for the customer relevant information.

12. The method according to claim 11 in which the agent is further provided with a URL indicating from which page the customer has requested help and with which the agent can set up the agent computer at the same page.

13. The method according to claim 12 in which the URL is provided to the agent by the step of the server sensing which URL is being read from all customer connections, and performing a look-up into a database to determine corresponding CLIDs, and correlating CLIDs as they come in with the URL.

14. The method according to claim 7 wherein a message is sent back to the customer with an anticipated wait time when no live agent is available for immediate help.

15. The method according to claim 7 wherein the step of the customer's computer preparing a help request form comprises receiving a telephone number input by the customer.

16. The method according to claim 7 wherein the step of the customer's computer preparing a help request form is done automatically by the customer computer.

17. In a communications system comprising a server connected to the Internet, customer premises equipment in a remote customer premises comprising a customer computer connectable to the Internet and a customer telephone having a telephone number and connected to a public switched telephone network, a call centre and a plurality of help agent workstations each comprising a help agent computer and a help agent telephone connectable through the public switched telephone network to the customer telephone, a method for the customer to obtain help in relation to a WWW page having a URL (universal resource locator) from the server displayed by the customer computer comprising the steps:

a) the customer selecting a remote help option from the page;

b) the customer computer signalling a telephone switch to ring the customer telephone with a normal ring or a distinctive ring in response to the customer selecting the help option;

c) the telephone switch dialling the call centre automatically when the customer the picks up the handset; and d) the call centre transferring the call to an available one of said help agent telephones.

18. The method according to claim 17 in which the call centre maintains a list of calls to be placed, and places the calls in the order in which the help requests were received.

19. The method according to claim 18 in which an outbound dialing system automatically maintains the list and places the calls.

* * * * *

UNITED STATES PATENT AND TRADEMARK OFFICE
CERTIFICATE OF CORRECTION

PATENT NO. : 5,884,032
DATED : Mar. 16, 1999
INVENTOR(S) : Thomas Howard Bateman, et al It is certified that error appears in the above-indentified patent and that said Letters Patent is hereby corrected as shown below:

In column 12, line 21, claim 3, "HHTP" should read --HTTP--.

Signed and Sealed this

Fifth Day of October, 1999

*Attest:*

Q. TODD DICKINSON

*Attesting Officer*     *Acting Commissioner of Patents and Trademarks*